Aug. 19, 1969     E. C. PUCKHABER     3,462,027

DUNNAGE DEVICE

Filed Aug. 14, 1967     2 Sheets-Sheet 1

INVENTOR.
EDMUND C. PUCKHABER

BY attorney

Aug. 19, 1969  E. C. PUCKHABER  3,462,027
DUNNAGE DEVICE

Filed Aug. 14, 1967  2 Sheets-Sheet 2

INVENTOR.
EDMUND C. PUCKHABER
BY David Rabin
attorney

United States Patent Office 3,462,027
Patented Aug. 19, 1969

3,462,027
DUNNAGE DEVICE
Edmund C. Puckhaber, 1427B Fernwood-Glendale Road,
Spartanburg, S.C. 29302
Filed Aug. 14, 1967, Ser. No. 660,424
Int. Cl. B65g *1/14, 1/20;* B65d *33/16*
U.S. Cl. 214—10.5                           4 Claims

ABSTRACT OF THE DISCLOSURE

This invention relates to the cushioning of cargo during shipment and relates particularly to an inflatable dunnage device having a thin, durable flexible inflatable bladder surrounded by a protective covering of nonwoven spun bonded polypropylene, the device having novel valve and end sealing means and method and being disposable because of its inexpensive construction.

BACKGROUND, BRIEF SUMMARY AND OBJECTS OF THE INVENTION

In the transportation of freight by rail, motor or air, it is required that the longitudinal and lateral dimensions of the freight carrying compartment be filled or bridged in order to prevent shifting of the merchandise during abrupt movement or stoppage of the carrying facilities. Void spaces both laterally and longitudinally have been filled with large inflatable reinforced rubber balloons of desired shape usually consisting of fabric-reinforced vulcanized rubber prepared by techniques similar to the manufacture of automobile tires. Other variations include a rubber bladder confined within the fabric-reinforced rubber balloon casing, though in either case, it is important that the fabric-reinforced rubber be of sufficient strength and thickness to confine a moderate pressure of air and resist abrasion and puncture by the articles of merchandise.

Inflatable rubber cushions do have disadvantages which render them economically impractical, the primary of which is that the cost of the materials and manufacture is great thus requiring the balloons to be used a great many times. This requirement necessitates the return of the balloons to the point of origin of shipment though this procedure is objectionable and involves the additional expense of maintaining books of account and other verifying records. Additionally, large expenditures are required to ensure an adequate supply of bags for operational use. Moreover, the rubber balloons are dimensionally weak and incapable of maintaining their shape therefore requiring particular treatment prior to their inflation and use.

More recent developments in the field of dunnage devices include the provision of an inflatable and disposable bag having an inner plastic bag acting as a bladder or air-containing member and an outside protective covering comprising layers of relatively strong and inexpensive materials such as burlap, sisal, rayon, craft paper and the like. Representative of such dunnage devices is the disclosure of U.S. Patent No. 3,199,689. The disposability of these devices eliminates the costly record keeping inherent in the use of rubber bags as well as the costly investment mentioned earlier.

There are, however, disadvantages in the use of disposable dunnage devices such as disclosed in the above-identified patent since the outer covering which is comprised of a great number of paper layers or similar material is bulky, somewhat costly to prepare and inherently weak in that moisture and sharp objects are detrimental to long life and successful use as is the case of nearly all paper products. Additionally, these devices usually have valve means at some side position intermediate the bag ends which makes inflation of the bags, once in the load securing position, sometimes difficult. Because of the particular characteristics of paper, it is often extremely difficult to utilize a reliable and economical sealing technique to make the device airtight.

With the foregoing in mind, the following invention is offered as a new and improved dunnage device comprising, in preferred form, an interior tubular bladder which inflates a single lightweight exterior cover made of a nonwoven spun bonded polypropylene material having extraordinary strength and moisture-resistant characteristics that eliminate drawbacks inherent in the use of ordinary paper-covered dunnage devices. Additionally, new and improved bag sealing means have been introduced which involve winding the open ends of the bladder and covering material about a number of corrugated strips and then sealing the ends by affixing a U-shaped metal clamp having depending converging legs about the folded bag ends. To avoid other disadvantages of conventionally constructed dunnage bags, the valve, which is heat-sealed to the bladder, extends through a folded edge of the dunnage device affording greater convenience and accessibility to an operator who fills or inflates the bags once they are positioned in load-sustaining locations.

Accordingly, it is a principal object of the present invention to provide an inflatable dunnage device which performs the cushioning functioning of the rubber balloons but which avoids the excessive cost thereof and which is disposable after a single use.

Another object of the present invention is to provide a disposable dunnage device of the type described which is collapsible to minimum size for convenient storage prior to use.

Yet another object of the present invention is to provide a disposable dunnage device of the type described in which the inexpensive inflatable bladder is confined within a casing may be made of a single layer of paper or fibrous nonwoven spun bonded material.

Still another object of the present invention is to provide an inflatable dunnage device of the type described having unique means for sealing the open ends of both the bladder and covering layer and allowing the positioning of a valve through these means so as to permit easy access for inflation once installed in a load-sustaining position.

Yet still another object of the present invention is to provide a novel method for sealably securing the ends of the bladder and cover forming a dunnage device described utilizing material strips and a U-shaped clamping member.

Other objects and advantages of the present invention will become more apparent from a study of the following detailed description taken in conjunction with the accompanying drawings in which like characters of reference designate like parts.

FIGURE DESCRIPTION

FIGS. 8(a) through 8(d) is a sequential portrayal of the steps of foldably sealing an end of the bladder and cover of the present invention with corrugated strips and a U-shaped clamping member.

DETAILED DESCRIPTION

Figure 1:
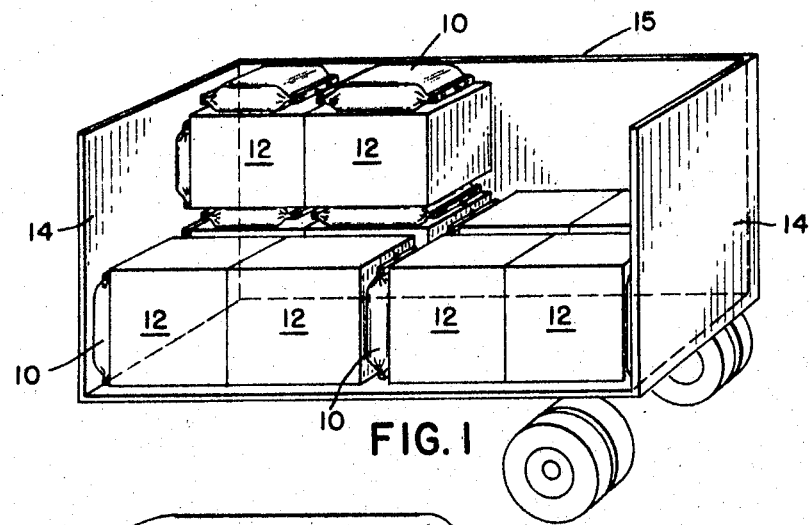
FIG. 1 is a perspective, fragmentary and exposed view of a number of dunnage bags embodying the present invention positioned in a load-sustaining manner amidst crates of merchandise aboard a trailer-truck bed.
Figure 2:
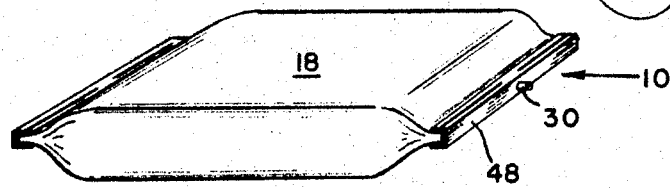
FIG. 2 is a perspective view of the exterior of a dunnage bag embodying the present invention showing the end-positioned valve extending through a U-shaped clamping member.

Referring now to the figures and particularly to FIG. 2, there is shown a dunnage device generally designated 10 in the form of a bag, and the usual manner of employing device 10 of this invention is to position the bag as illustrated in FIG. 1 between the crates or loads 12 of merchandise and the walls 14 of the cargo container 15 against which the loads 12 would bear if no bags were present. The bags 10 are positioned in the zone specified and illustrated and are then inflated to cause them to bulge outwardly against the loads and the walls. These bags may be of any convenient sizes, commonly applied dimensions being about two feet by four feet and four feet by nine feet; and the devices may be inflated at pressures up to 30 pounds per square inch though normally pressures of from five to ten pounds per square inch appear satisfactory.

Figure 7:
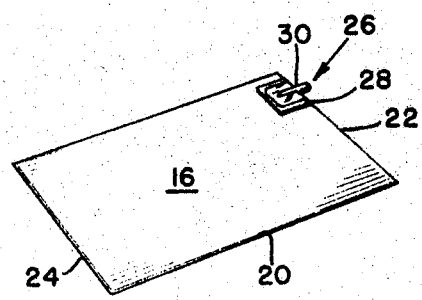
FIG. 7 is a perspective view of the bladder of the present invention showing the positioning of the valve along one end thereof which is heat sealed along a flange to the bladder end.

An airtight bladder 16 (FIG. 7) is used inside the exterior covering 18 of dunnage device 10 and is preferably formed of polyethylene plastic of about 8 to 10 thousandths of an inch thick. Initially it is flattened into a double longitudinally extending layer which requires heat sealing along one lateral edge 20 and along both the forward end 22 and the rearward end 24 though heat sealing of the two ends is not necessary because of the clamping arrangement employed which will be subsequently described. With the side and ends thus sealed, the bladder is in the shape of a flat enclosure which is then air tight.

Figure 3:
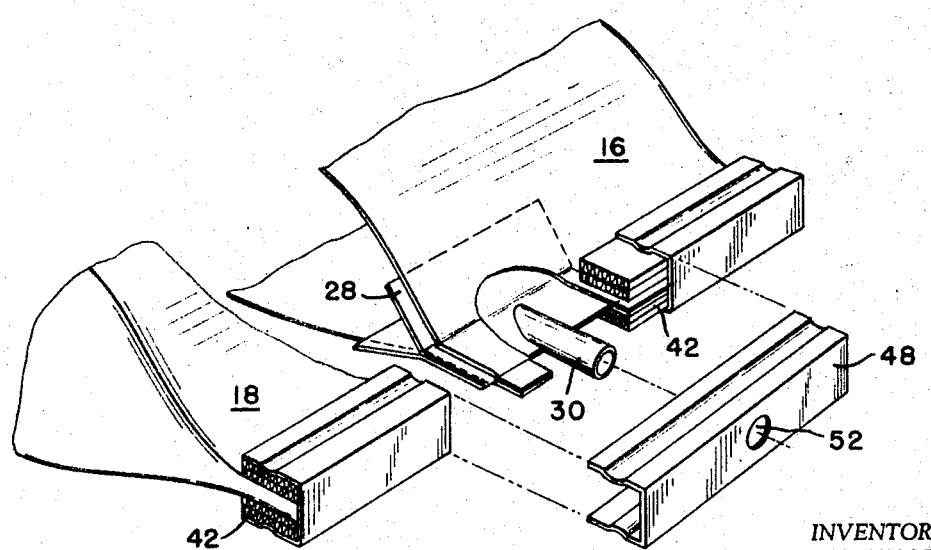
FIG. 3 is a perspective, exploded, fragmentary and sectional view of the sealed end and valve means of a dunnage device embodying the present invention.

A valve generally designated 26 is affixed to one end 22 of the bladder 16 by the provision of a flange 28 constituting the securing portion of the valve 26 which is heat sealed to the end 22 (FIG. 3) to provide an air tight valve connection. A stem 30 having appropriate and conventional means within (not shown) to hold air under pressure extends outwardly from the end 22 of bladder 16 through the end opening of the bag covering 18 for easy access by an attendant when inflation is desired.

Disposable dunnage bags have been surrounded with multiple layers 32, 34 and 36 of reinforcing paper material, the outer layer 32 of which can be waterproofed with asphalt, polyethylene or any waterproofing material capable of being applied to and dried on paper so that the final dunnage device has some water repellant characteristics. The other layers 34 and 36 can consist of burlap, sisal, rayon or other reinforced paper to provide additional strength. While these paper layers are quite adequate for producing a substantial dunnage device using the above-described valve along with the closure assembly subsequently to be discussed, it has been found to be most desirable from a cost and application standpoint to use a nonwoven spun-bonded polypropylene material having extraordinary strength now produced by Dupont so that only a single layer 40 (FIG. 4) need be constructed over the polyethylene bladder 16. The use of this new material eliminates the multiple layers heretofore required and results in a dunnage bag of greatly reduced weight. Additionally, the durability of the spun bonded material 40 is much greater than any number of paper layers, and the material resists puncture, tearing, moisture, chemicals and numerous other deleterious substances which would normally destroy, to some extent, dunnage devices used with multiple layers of covering. Because the material is a thermoplastic, it can be heat sealed along the lateral or longitudinal edge to provide a tubular member just as was done with the polyethylene bladder 16 described above though glueing or sewing the tubular member along this edge is preferable.

Figure 4:
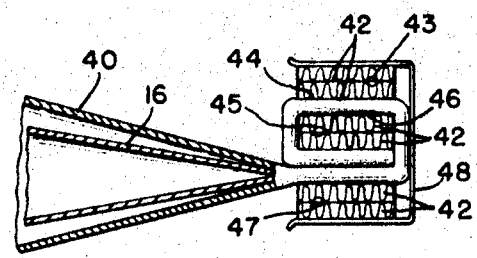
FIG. 4 is a side elevational, fragmentary and sectional view of a novelty sealed end of a dunnage device having an interior bladder and a single exterior cover formed of high strength material.
Figure 5:
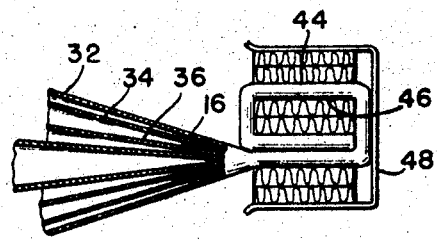
FIG. 5 is a side elevational, fragmentary and sectional view of a novelty sealed end of a dunnage device embodying the present invention having an interior bladder and an exterior cover formed by a plurality of envelopes or covers encircling the bladder.

The dunnage devices are preferably closed by novel steps and arrangement and use of components, and this procedure centers about the use of a number of corrugated strips 42 aligned along the sides 44 and 46 of each end of the dunnage device as shown in FIGS. 4 and 5. Two pairs 43 and 45 of such strips 42 are placed on each side 44 and 46 of the bladder and covering ends which ends are then folded simultaneously as shown in FIG. 4 until wall 44 becomes contiguous with wall 46. An additional pair 47 of strips are then placed along wall 44 in the manner illustrated in FIG. 4 so that the wound ends of bladder 16 and covering 40 are externally buffered by pairs 43 and 47 of corrugated strips 42. A U-shaped metal clamping member generally designated 48 having a pair of depending legs 50 converging in the relaxed condition is clamped over the bladder and covering ends and cooperating corrugated strips 42 after the ends of the bladder and covering have been turned to grip firmly the sealed end in a manner to prevent air leakage when the bag is subsequently inflated. The clamp 48 has an aperture 52 designed to accommodate the valve stem 30 and strengthen the valve 26 and its flange 28 and stem 30 positioned at one end of the device 10.

The end sealing technique described above can be equally adapted to the sealing of conventional dunnage devices having an interior bladder 16 surrounded by multiple layers 32, 34, 36 and 38 of paper such as illustrated in FIG. 5. The same technique is used whereby a number of cooperating corrugated strips border each end of the bladder and enveloping layers so that these ends may be wound upon themselves cooperatively with the corrugated strips and a metal clamping member then inserted to secure the bag ends and prevent unwinding when the bag is inflated.

Figure 6:
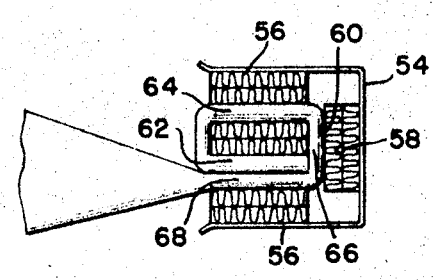
FIG. 6 is a side elevational, fragmentary and sectional view of an alternative embodiment of the novelty sealed end of the dunnage device disclosed herein.

Another variation in the sealing process as well as the structural configuration resulting therefrom is particularly illustrated in FIG. 6 where a U-shaped member 54 having somewhat elongated depending legs 56 releasably clamps over the folded bladder and cover ends similar to the technique described above but with the exception that yet another pair 58 of corrugated strips 42 is placed against the end 60 so that additional pressure can be exerted to close the ends of bladder 16 and its covering. As a result of the sealing technique described, a clamping effect is experienced at three locations 62, 64, 66 and 68 along the sides of the bladder and covering member. Since the bladder 16 has already been heat-sealed along its forward and rearward edges 22 and 24, an extremely and efficient end sealing is accomplished by folding the sealed ends of bladder 16 along with the longitudinally extending ends of the bladder cover.

Figure 8:
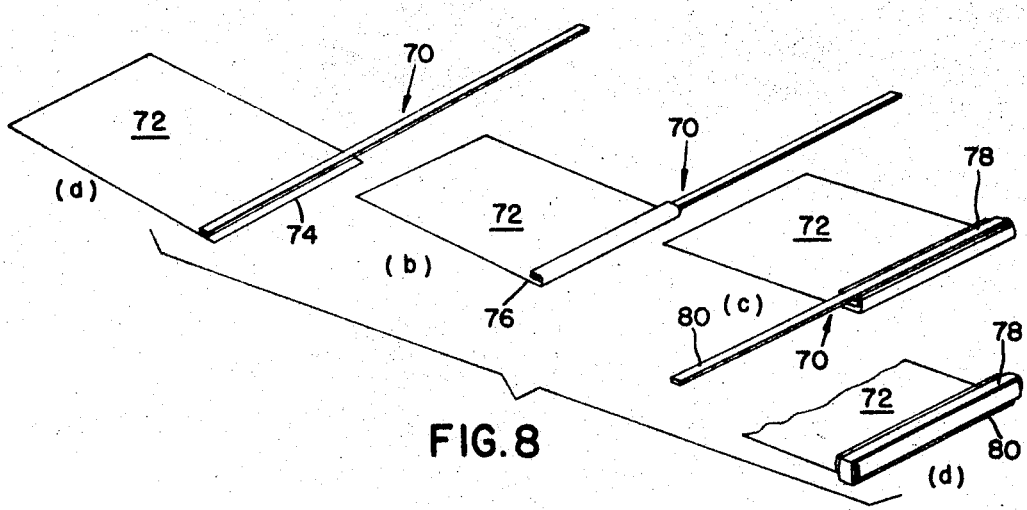

To facilitate rapid production of dunnage bags having at least one sealed end, it has been found advantageous to utilize a predetermined length 70 of corrugated strip material comprising one or more layers in the manner depicted in FIG. 8 through a sequence of views. The combined bag and cover 72 is positioned in a flat folded manner and the corrugated strip length 70 is placed along the sides of the bladder and cover end 74. The bladder and cover ends are then folded over the portion 76 of strip length 70, and a second portion 78 of the strip length 70 is then folded across the previously folded bladder and cover ends as well as the first portion of the strip length. The final step is to again fold the previously folded bladder and cover ends as well as the first portion of the corrugated strip over the second portion of the strip, and then folding the third portion 80 of strip length 70 upon the folded bladder and cover ends and the first and second portions of the strips to suitably seal the end of the bladder and cover 72 so that the configuration cross-sectionally viewed is essentially the same as that illustrated in FIG. 4 as soon as the U-shaped member 48 is positioned thereon.

Thus there has been disclosed, in the broadest sense, an inflatable dunnage bag for cushioning a load in a cargo vessel having an inflatable air tight longitudinally extending bladder member of relatively thin, flexible, synthetic thermoplastic film material, a covering of strong flexible material enveloping that bladder and novel securing and closing means for sealing the ends of the bladder and covering. The device also contains a valve positioned at one end of the bladder extending from the bladder and cover ends securing and closing device. The bladder and cover ends are closed by the use of a plurality of material strips positioned on the sides of the bladder and covering means which are folded and then secured by a U-shaped metal clamp and effectively seals the ends completely.

The technique of sealing the end of the inflatable dunnage bag includes, in preferred form, using a length of strip material which can be alternately folded across the ends of the bladder and cover as those ends are in turn folded upon each other and the material strips.

The construction of a dunnage device as shown with the single layer of a spun-bonded covering reflects numerous advantages over conventional bags made from multilayer coverings, and it is believed that the single layer construction can be manufactured at a reduced price and that reuse of these dunnage devices may be possible to a limited extent. However, it will be apparent that the novel valve and sealing arrangement disclosed herein may be equally applicable for conventional multilayer bags. Although only a few embodiments of the invention are shown and described, it is to be understood that numerous changes may be made in the closure construction and procedure, the enveloping covering and the valve means as well as other facets of the present inventive concept without departing from the true scope of the invention as defined by the appended claims and such modifications are contemplated.

I claim:
1. An inflatable dunnage device for cushioning a load in a transportation medium comprising: an inflatable air tight longitudinally extending bladder member of relatively thin, flexible, synthetic thermoplastic film material; a longitudinally extending covering of strong flexible material containing said bladder member; means securing and closing the ends of said bladder member and covering; and valve means at one end of the interior bladder member having a valve stem extending through said securing and closing means, said bladder member being inflatable by the valve and the flexible material of the covering being of sufficient strength to provide reinforcement for the bladder member when inflated to prevent bladder member rupture when the dunnage device is subjected to impacts from the load.

2. A dunnage device as claimed in claim 1, said securing and closing means including a plurality of material strips positioned on the sides of said bladder member and covering ends, and a substantially U-shaped metal clamp securing said bladder and covering ends over said strips.

3. A dunnage device as claimed in claim 1, said valve means including a stem and a flange, said flange being heat-sealed to said bladder member, and said stem communicating with the bladder member and extending through the end opening of the covering to provide an air passage for inflating the bladder member and surrounding cover.

4. A dunnage device as claimed in claim 1, said covering comprising a layer of nonwoven spun-bonded polypropylene material.

References Cited
UNITED STATES PATENTS

| | | | |
|---|---|---|---|
| 2,724,543 | 11/1955 | Baver | 229—65 X |
| 3,072,270 | 1/1963 | Tolby et al. | 214—10.5 |
| 3,199,689 | 8/1965 | Feldkamp | 214—10.5 |

FOREIGN PATENTS 882,596   11/1961   Great Britain.

GERALD M. FORLENZA, Primary Examiner

FRANK E. WERNER, Assistant Examiner

U.S. Cl. X.R.

105—369; 229—65